United States Patent
Hatakenaka et al.

(10) Patent No.: US 6,563,542 B1
(45) Date of Patent: May 13, 2003

(54) ELECTRONIC CAMERA

(75) Inventors: Akira Hatakenaka, Hino (JP); Akio Terane, Sagamihara (JP); Masaomi Tomizawa, Hachioji (JP); Hideaki Yoshida, Hachioji (JP)

(73) Assignee: Olympus Optical Co., Ltd., Shibuya-Ku (JP)

( * ) Notice: Subject to any disclaimer, the term of this patent is extended or adjusted under 35 U.S.C. 154(b) by 0 days.

(21) Appl. No.: 09/149,618

(22) Filed: Sep. 8, 1998

(30) Foreign Application Priority Data

Sep. 9, 1997 (JP) .............................................. 9-244478

(51) Int. Cl.⁷ .............................................. H04N 5/222
(52) U.S. Cl. .............................. 348/333.02; 348/207.2
(58) Field of Search ................................ 348/552, 207, 348/333.02; 347/2; 386/1, 46, 117, 38; 358/909.1, 906, 1.11, 1.8

(56) References Cited

U.S. PATENT DOCUMENTS

| | | | | |
|---|---|---|---|---|
| 5,500,743 A | * | 3/1996 | Sakaegi | 358/403 |
| 5,633,678 A | * | 5/1997 | Parulski et al. | 348/231 |
| 5,637,871 A | * | 6/1997 | Piety et al. | 250/330 |
| 5,737,491 A | * | 4/1998 | Allen et al. | 348/211 |
| 5,742,339 A | * | 4/1998 | Wakui | 348/231 |
| 5,748,326 A | * | 5/1998 | Thompson-Bell et al. | 358/296 |
| 5,767,945 A | * | 6/1998 | Fields et al. | 355/39 |
| 5,771,380 A | * | 6/1998 | Tanaka et al. | 345/472 |
| 5,857,121 A | * | 1/1999 | Arai et al. | 396/51 |
| 6,020,982 A | * | 2/2000 | Yamauchi et al. | 358/401 |
| 6,104,864 A | * | 8/2000 | Kondo et al. | 385/12 |
| 6,111,605 A | * | 8/2000 | Suzuki | 348/220 |

* cited by examiner

*Primary Examiner*—Andrew Christensen
*Assistant Examiner*—Eric Wisdahl
(74) *Attorney, Agent, or Firm*—Volpe and Koenig, P.C.

(57) ABSTRACT

An electronic camera includes a menu switch for displaying, on a display, the first print mode of printing only image data and the second print mode of superimposing and printing attendant data on image data, increment and decrement switches for moving menu items, and an execution switch for determining and executing a target item, wherein when an image file recorded on a recording medium is to be displayed on the display, if the electronic camera is in the first print mode, attendant data is superimposed and displayed on image data after the start of display, and display is switched to display of only the image data after a predetermined period, or if the electronic camera is in the second print mode, attendant data is always superimposed and displayed on image data during display.

19 Claims, 4 Drawing Sheets

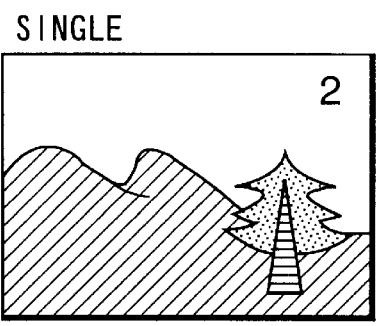
FIG. 4A
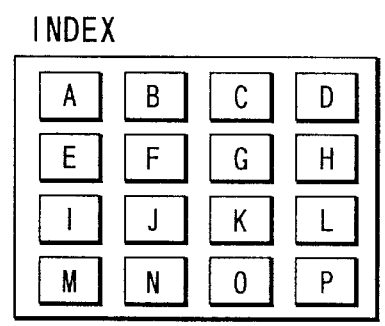
FIG. 4B
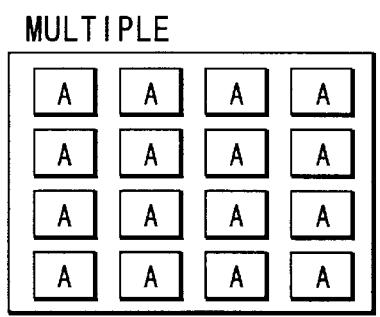
FIG. 5A
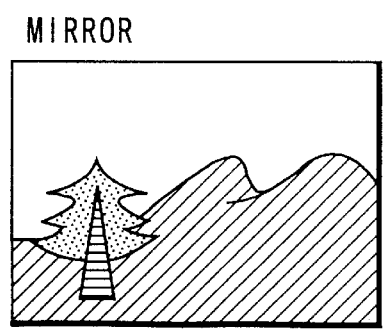
FIG. 5B
FIG. 5C
FIG. 5D

ELECTRONIC CAMERA

BACKGROUND OF THE INVENTION

The present invention relates to an electronic camera and, more particularly, to an electronic camera for reconstructing an image file, outputting it to a printer for printing it.

In recent years, electronic cameras for electrically recording an optical image of a subject by converting the image into an electrical signal using the photoelectric conversion action of a semiconductor represented by silicon have practically been used instead of so-called silver salt cameras for recording an image on a film using the chemical photosensitive action of silver halide. Of such electronic cameras, so-called digital cameras for digitally recording an electrical signal are becoming a major stream.

In such a digital electronic camera, image information of a subject is digitally recorded on a recording medium fixedly or detachably mounted on the camera body. The recorded image data is transferred to a general-purpose personal computer (to be referred to as a PC hereinafter) by cable connection, radio (in many cases, infrared ray) communication, or the like via a data communication port formed at a proper portion of the camera body.

When the recording medium can be detached, data can also be transferred by removing the recording medium (in many cases, formed in a card shape) from the camera and reading data from the recording medium using a proper data reader (drive).

In the PC, the transferred image data is freely displayed on the display, processed (edited), saved, or printed out using a printer connected to the PC.

Since the electronic camera has a function as an image input device to the PC, image data is generally treated as a file similarly to the PC. One still image typically corresponds to one file.

In the electronic camera, the image data is accompanied with attendant data. The most typical attendant data is data related to the image-pickup date and time for the image data (also referred to as date data or "date"). The date data is recorded using a timepiece function incorporated in the camera.

In a conventional silver salt camera (at least before the advent of a recent advanced photo system), the date can only be technically recorded by superimposing the date as an image (character pattern) on a film. For this reason, a "date-imprinted photograph" in which the date is superimposed as a character at one corner of the photograph is very popular. Whether the date character is superimposed is inevitably determined in photographing (film exposure), and cannot be changed after that.

To the contrary, in the electronic camera, since the image itself is digitized, as described above, the date and time can be recorded without superimposing them on image data by adding digital data about date information as attendant data to image data and processing these data as one image file. Accordingly, whether the date character is superimposed on the image can be arbitrarily selected in display or printing, and the date data can be used to manage the image in a reconstruction device (e.g., the camera itself or the PC).

In an actual camera, if necessary, various image-pickup data, e.g., the frame number, so-called comment data as recording contents arbitrarily input by the camera operator, data about the image quality such as the number of pixels and the compression ratio, exposure data such as the shutter speed, the f-number, and the electronic flash, lens data such as the subject distance, the lens focal length, and macro image pickup, data about the white balance and the light source, and image-pickup mode data such as the self-timer and a set of series pictures or a set of related pictures are employed as attendant date in addition to the date data.

In an electronic camera using a conventional general PC, when such attendant data is to be displayed or printed, how to display or print the data can be freely optimized in software in use. That is, since the display window area of the general PC has a sufficient resolution and a wide area, a plurality of images can be simultaneously displayed, and the print mode and the operation menu can be simultaneously displayed in a space other than the images.

Recently, in addition to PC users, general users have also demanded electronic cameras, and an apparatus (to be referred to as a direct print apparatus hereinafter) for printing an image by connecting the camera and the printer directly via a cable or radio communication without any PC is receiving a great deal of attention. In an electronic camera having this function, the image display is only a display incorporated in the electronic camera body. The major stream of the image display incorporated in the electronic camera body is a 2" or less color LCD because the usable device is limited by the size, cost, power, and the like. Therefore, simple display must be implemented within the limited display performance (resolution and area).

One example of the implementation is a so-called hierarchical menu wherein, instead of simultaneously displaying all the menus of one related operation, a limited number of menus are displayed in one window called a page which includes a menu for shifting to the next page or returning to the previous page by selecting and executing this menu.

As is well known, the electronic camera has a variety of functions, and the number of functions tends to increase even before the advent of the direct print function. In the prior art, the whole operation cannot be made simple even with various implementations.

In employing the direct print function, it is therefore very effective for technical significance to simplify operation and display and decrease the number of operation procedures.

BRIEF SUMMARY OF THE INVENTION

It is an object of the present invention to provide an electronic camera with good operability which facilitates identification of whether attendant data is superimposed on image data in printing.

According to the present invention, there is provided an electronic camera comprising an image sensing unit for sensing an image, a recording medium for storing an image file including image data obtained by the image sensing unit and attendant data, a reconstruction unit for reconstructing the image file from the recording medium and outputting the reconstructed image file to a printer, a display unit for displaying the image data and attendant data of the image file, a selection unit for selecting a first print mode of printing only the image data in printing by the printer, and a second print mode of superimposing and printing the attendant data on the image data in printing, and a control unit for selectively executing the first print mode and the second print mode in accordance with selection of the selection unit, wherein when the first print mode is selected, the control unit executes a first display mode of superimposing and displaying the attendant data of the image file on the image data for a predetermined period after start of display of the image file on the display unit, and displaying only the image data, and when the second print mode is selected, executes a second display mode of always superimposing and displaying the attendant data of the image file on the image data during display of the image file on the display unit.

In the electronic camera, the attendant data is data including at least one of a date and time.

In the electronic camera, in the first display mode, attendant data is superimposed and displayed on image data for a predetermined period in response to a predetermined operation, and then the display window returns to display of only the image in which no attendant data is superimposed on the image data.

According to the present invention, the first print mode of printing only image data in printing, or the second print mode of superimposing and printing attendant data on image data in printing is selected by the selection unit. When the first print mode is selected, the first display mode is set to superimpose and display the attendant data of an image file on the image data for a predetermined period after the start of display of the image file on the display, and to switch the display window to display of only the image data. When the second print mode is selected, the second display mode is set to always superimpose and display the attendant data of an image file on the image data during display of the image file on the display, and to print the image file by reconstructing an image file having the attendant data independently of the image data and outputting the image file to a printer.

The attendant data includes at least one of the date and the time.

In the first display mode, the attendant data is superimposed and displayed on the image data for a predetermined period in response to a predetermined operation, and then the display window returns to display of only an image in which no attendant data is superimposed on the image data.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 4A and 4B are views showing a print menu displayed on the display of the electronic camera according to the embodiment;

FIGS. 5A, 5B, 5C, and 5D are views showing examples of selectable items on the first page of the print menu in the embodiment;

DETAILED DESCRIPTION OF THE INVENTION

Embodiments of the present invention will be described below with reference to the several views of the accompanying drawing.

Figure 1:
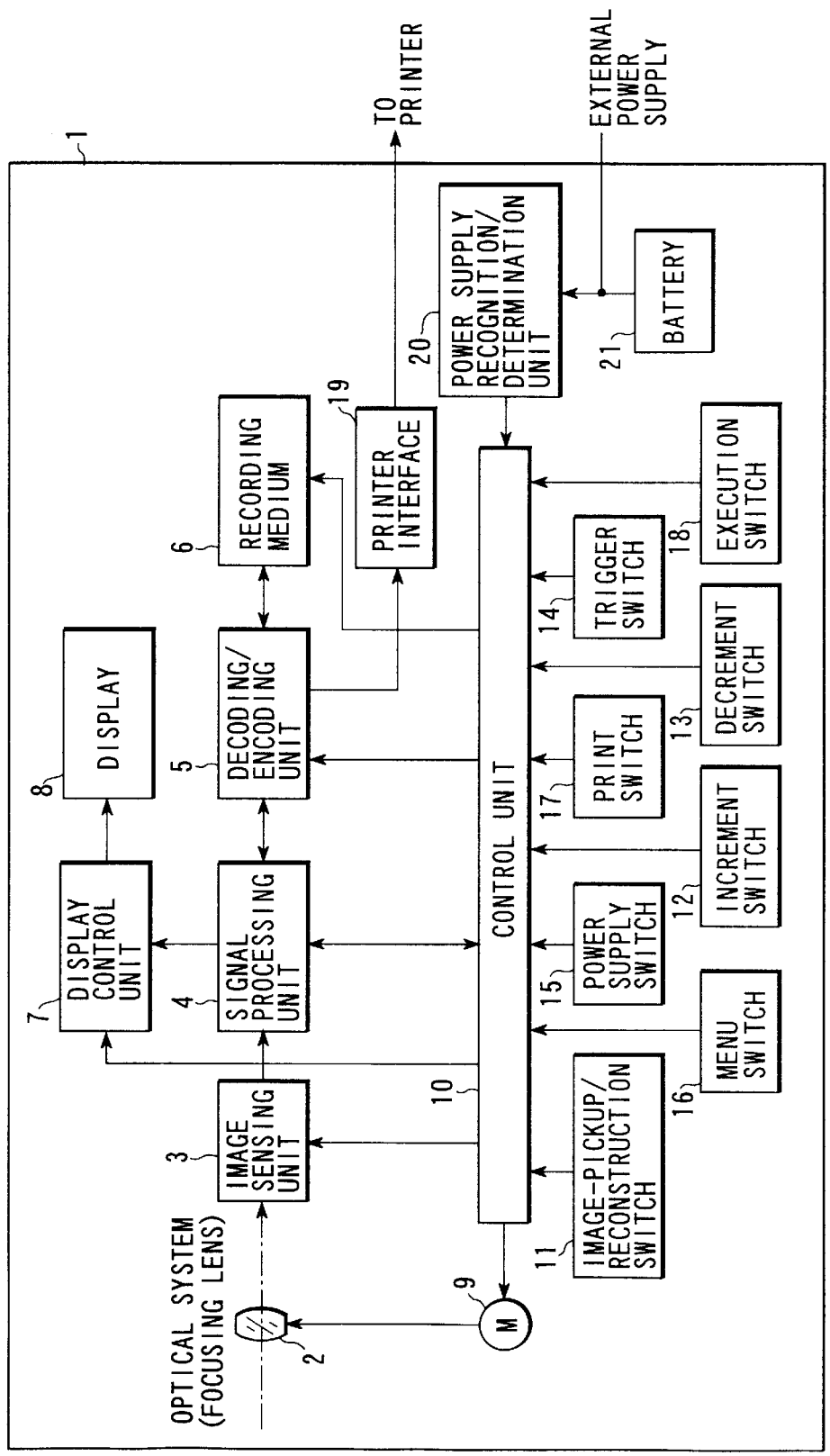
FIG. 1 is a block diagram showing the arrangement of an electronic camera according to an embodiment of the present invention.
Figure 2:
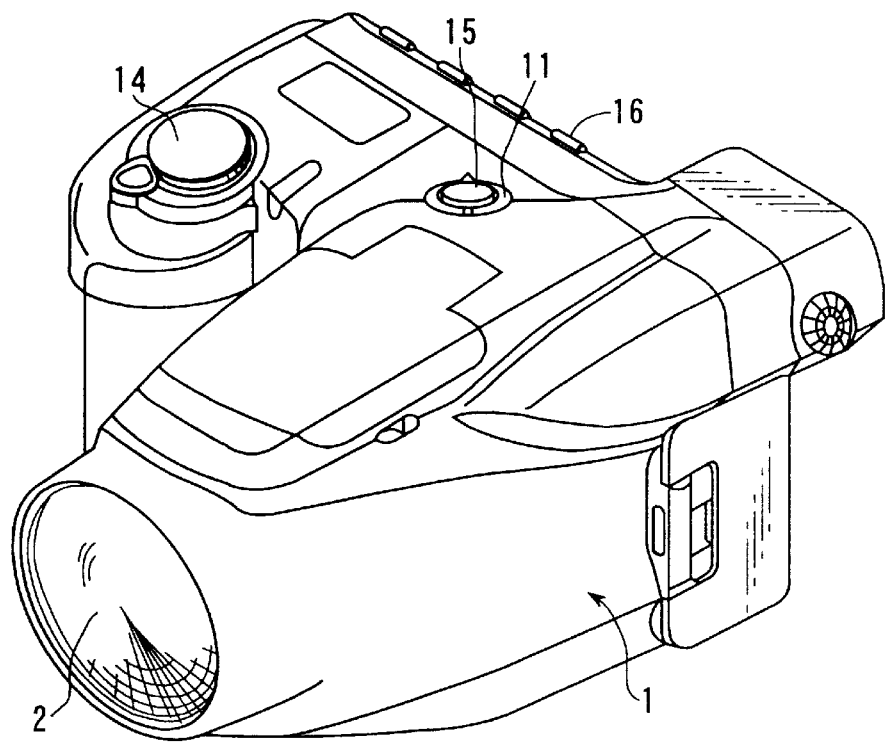
FIG. 2 is a perspective view showing the front-side outer appearance of the electronic camera according to the embodiment.
Figure 3:
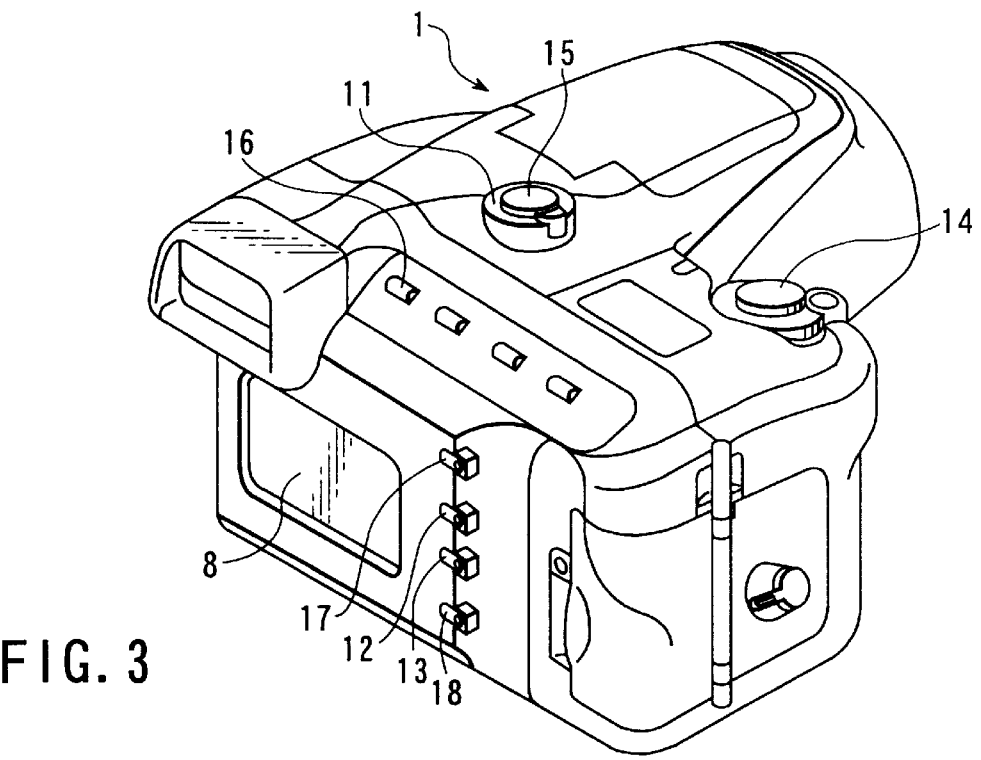
FIG. 3 is a perspective view showing the rear-side outer appearance of the electronic camera according to the embodiment.

An electronic camera 1 is constituted as shown in FIGS. 1 to 3. More specifically, an optical system 2 comprises a focusing lens for adjusting the focal point in order to form a subject image on an imaging plane (to be described later), and faces an image sensing unit 3 for photoelectrically converting the subject image formed on the imaging plane by the optical system 2 and further converting the analog signal into a digital signal. The image sensing unit 3 is connected to a signal processing unit 4 for performing various processes for the digital signal output from the image sensing unit 3. The signal processing unit 4 is connected to an encoding/decoding unit 5 for performing encoding to compress output data from the signal processing unit 4 and decoding to decompress data compressed and recorded. The encoding/decoding unit 5 is connected to a recording medium 6 constituted by, e.g., a flash memory which records and saves data encoded by the encoding/decoding unit 5 and is incorporated in or detachably mounted on the electronic camera 1. The encoding/decoding unit 5 is also connected to a printer interface 19 for outputting data decoded by the encoding/decoding unit 5 to an external printer connected to the electronic camera 1.

A display control unit 7 outputs a signal for displaying an image upon reception of an output from the signal processing unit 4, and incorporates a character generator for generating a frame number display character and the like. A display 8 is controlled based on an output from the display control unit 7, and is constituted by, e.g., an LCD arranged on the rear side of the electronic camera 1 in order to display an image, a frame number, and the like.

A power supply recognition/determination unit 20 is arranged to determine whether the electronic camera 1 is driven by a battery 21 or an external power supply, and to recognize the residual battery amount and output it to a control unit 10 (to be described later) by measuring the voltage upon battery driving. A focusing motor 9 is arranged to drive the focusing lens of the optical system 2.

The control unit 10 is connected to the image sensing unit 3, the signal processing unit 4, the encoding/decoding unit 5, the recording medium 6, the display control unit 7, and the power supply recognition/determination unit 20, and integrally controls the electronic camera 1 in association with switches 11 to 18.

The image-pickup/reconstruction switch 11 is arranged to switch the mode of the electronic camera 1 between image-pickup and reconstruction modes. The increment switch 12 is arranged to increment an item whose order is defined, e.g., the frame number, whereas the decrement switch 13 is arranged to decrement it. The trigger switch 14 is arranged to input an instruction for instructing an image-pickup and a recording operation to the electronic camera 1. The power supply switch 15 is arranged to input a command of turning on/off the main power supply of the electronic camera 1. The menu switch 16 is arranged to display various setting menus on the display 8, and the print switch 17 is arranged to display a setting print menu on the display 8 in printing from an external printer. The execution switch 18 is arranged to determine and execute items and the like selected on the menu and the print menu.

The power supply switch 15 is arranged as a depression button switch at almost the center of the top of the electronic camera 1. The image-pickup/reconstruction switch 11 is arranged as a substantially ring-like pivot switch around the power supply switch 15. The trigger switch 14 is arranged as a depression switch at a position where the user can depress it with the user's forefinger when gripping the electronic camera 1 with his or her right hand. The print switch 17, the increment switch 12, the decrement switch 13, and the execution switch 18 are sequentially aligned as depression switches from the top to the bottom on the right side of the display 8.

The image-pickup operation of the electronic camera 1 having this arrangement will be explained.

In an image pickup, the mode of the electronic camera 1 is set at the image-pickup mode by the image-pickup/reconstruction switch 11. Then, power is supplied to the image sensing system including the image sensing unit 3 and the focusing motor 9. A subject image formed on the imaging plane of the image sensing unit 3 by the optical system 2 is converted into a digital image signal by the image sensing unit 3, and the digital image signal is output to the signal processing unit 4. The digital image signal is processed by the signal processing unit 4 and displayed on the display 8 via the display control unit 7. The user determines, e.g., the composition of the subject while seeing the display on the display 8.

The output from the signal processing unit 4 is also input to the control unit 10, and the control unit 10 determines whether the focal position is proper. When the focal position is improper, the control unit 11 controls the focusing motor 9 to drive the focusing lens of the optical system 2 to an in-focus position.

When the focal position, the composition, and the like are proper, and the user depresses the trigger switch 14 to record the image, the image signal of the signal processing unit 4 is encoded by the encoding/decoding unit 5, and the encoded signal is recorded as, e.g., one file unit per image on the recording medium 6 on the basis of a predetermined format.

At this time, the image file includes image data, and if necessary, attendant data such as date data, the frame number, comment data, image quality data (e.g., the number of pixels and the compression ratio), exposure data (e.g., the shutter speed, the f-number, and the electronic flash), lens data (e.g., the subject distance, the lens focal length, and the macro image pickup), data about the white balance and the light source, and image-pickup mode data (e.g., the self-timer, a set of series pictures, and a set of related pictures). Of these attendant data, date data is generated by a timepiece incorporated in the electronic camera, and comment data or image quality data is manually set by the user. Exposure data, lens data, white balance data, image-pickup mode data, and the frame number are automatically set by various function control devices inside the camera. To add these data to the image file, the data are temporarily stored in a memory incorporated in the control unit by the control unit 10 upon the image pickup, transferred to the display control unit 7 by an operation switch, as needed, and converted into character information by the character generator of the display control unit 7.

The operation of reconstructing an image recorded by the electronic camera 1 will be explained.

In reconstruction, the mode of the electronic camera 1 is set at the reconstruction mode by the image-pickup/reconstruction switch 11.

When a frame number is designated by the increment or decrement switch 12 or 13, an image corresponding to the designated frame number is reconstructed, and image data corresponding to this frame number is read out from the recording medium 6. For example, when the first frame is to be reconstructed, image data of the first frame is read out, decoded by the encoding/decoding unit 5, and displayed on the display 8 via the signal processing unit 4 and the display control unit 7. The display control unit 7 generates a character corresponding to the frame number (in this case, 1) with the incorporated character generator, superimposes the character on the image data, and displays them on the display 8.

When the user wants to reconstruct the second frame and operates the increment switch 12, the control unit 10 starts control to reconstruct the second frame and display the image of the second frame on the display 8 together with the frame number (in this case, 2).

Such display is similarly performed when display of the second frame is shifted to display of the third frame, when the number of a frame to be displayed is decremented by operating the decrement switch 13, and when display is shifted to a frame arbitrarily designated.

The operation of printing an image recorded by the electronic camera 1 will be explained.

In printing, the user depresses the print switch 17. Then, a print menu like the one shown in FIGS. 4A and 4B is displayed on the display 8. This print menu is made up of, e.g., two windows. A print menu like the one shown in FIG. 4A is displayed immediately after the print switch 17 is depressed, and the next window like the one shown in FIG. 4B is displayed after an item (NEXT) for shifting to the next page on this menu is executed.

The print menu made up of two pages is set to allow the user to select an item requiring a short time to execute printing from the first page, and to allow the user to select an item requiring a relatively long time to execute printing from the second page.

More specifically, the print menu on the first page shown in FIG. 4A displays the following items so as to allow the user to select them: SINGLE PRINT (see FIG. 5A) for printing only a selected image, INDEX PRINT (see FIG. 5B) for printing a predetermined number (e.g., 16) of images on one printing sheet in the order of the frame number, MULTIPLE PRINT (see FIG. 5C) for printing the same image on one printing sheet a predetermined number (e.g., 16) of times, MIRROR PRINT (see FIG. 5D) for reversing only one selected image with respect to the central vertical axis and printing it, an item (NEXT) for shifting to the next page, and an item (END) for ending the print menu.

On the left side of these items, an arrow indicating a target item is displayed. The arrow moves upward by one when the user depresses the increment switch 12, and downward by one when the user depresses the decrement switch 13.

When the arrow moves to an item to be selected, the user depresses the execution switch 18 to select and determine this item.

When the user executes the item (NEXT) for shifting to the next page out of the items shown in FIG. 4A, the next window like the one shown in FIG. 4B is displayed. The print menu on the second page shown in FIG. 4B displays the following items so as to allow the user to select them:

PRINT ALL for printing all the images recorded on the recording medium 6, SELECT IMAGE for selecting an arbitrary image (or a plurality of images) of the images recorded on the recording medium 6, SELECT PRINT for printing all the images selected by SELECT IMAGE, an item (PREV) for shifting to the previous page shown in FIG. 4A, and an item (END) for ending the print menu, similar to the first page.

SELECT IMAGE is an item for selecting an image to be printed, as described above. By selecting this item, images recorded on the recording medium 6 are sequentially displayed. When an image to be printed is displayed, the user depresses the execution switch 18 to mark the image, and marked images are printed by executing SELECT PRINT.

In printing, whether attendant data, and particularly date data are to be superimposed on image data and printed is selected from a menu displayed by operating the menu switch 16. This will be explained with reference to FIG. 6.

Figure 6A:
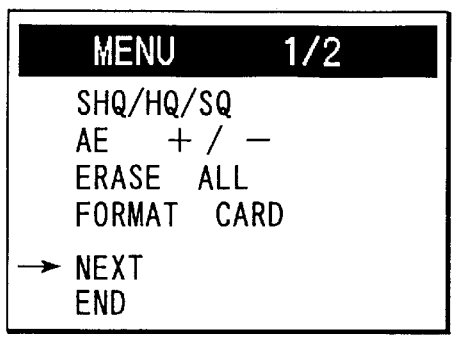
FIGS. 6A, 6B, 6C, and 6D are views showing examples of the menu of the electronic camera according to the embodiment.

Immediately after the user depresses the menu switch 16 while the electronic camera 1 is set at the image-pickup mode by the image-pickup/reconstruction switch 11, the first page of a menu made up of two pages like the one shown in FIG. 6A is displayed. That is, the menu on the first page shown in FIG. 6A displays the following items so as to allow the user to select them: an item for selecting the image quality of image data to be recorded on the recording medium 6 from a super high quality (SHQ), a high quality (HQ), land a standard quality (SQ), an item (AE +/-) for correcting the exposure, an item (ERASE ALL) for erasing all the recorded image data, an item (FORMAT CARD) for initializing the recording medium 6, an item (NEXT) for shifting to the next page, and an item (END) for ending the menu.

Figure 6B:
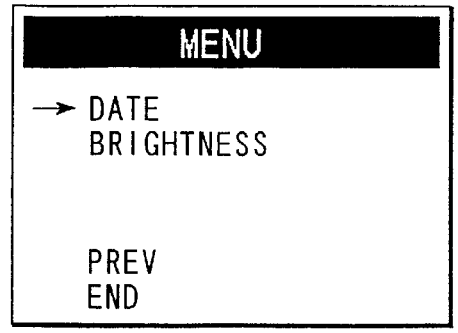

When the user executes the item (NEXT) for shifting to the next page, the menu on the second page shown in FIG. 6B is displayed on the display 8.

The menu on the second page shown in FIG. 6B displays the following items so as to allow the user to select them: an item (DATE) for setting date data, an item (BRIGHTNESS) for setting the brightness, an item (PREV) for returning to the previous page shown in FIG. 6A, and an item (END) for ending the menu, similar to the first page.

Figure 6C:
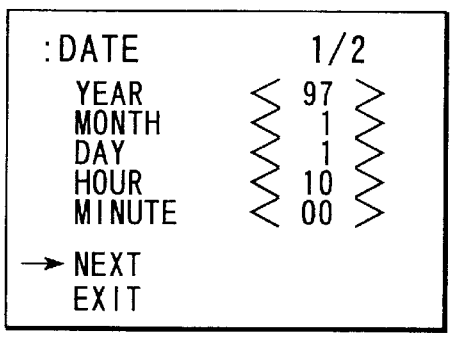

If the user selects the item (DATE) for setting date data, the first page of a date setting menu as a hierarchical menu lower by one level made up of two pages like the one shown in FIG. 6C is displayed on the display 8. The date setting menu on the first page shown in FIG. 6C displays the following items so as to allow the user to select them: an item (YEAR) for setting the year, an item (MONTH) for setting the month, an item (DAY) for setting the day, an item (HOUR) for setting the hour, an item (MINUTE) for setting the minute, an item (NEXT) for shifting to the next page, land an item (EXIT) for returning to the hierarchy higher by one level shown in FIG. 6B.

Figure 6D:
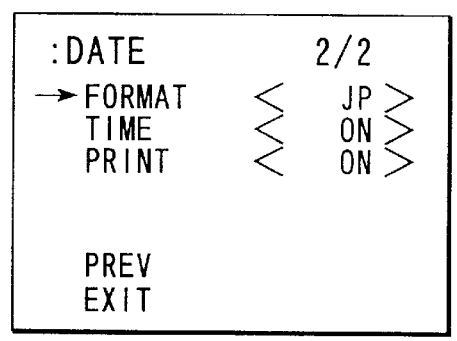

If the user selects the item (NEXT) for shifting to the next page, the date setting menu on the second page shown in FIG. 6D is displayed on the display 8. The date setting menu on the second page shown in FIG. 6D displays the following items so as to allow the user to select them: an item (FORMAT) for performing setting of each country, an item (TIME) for setting whether the hour and minute are displayed, a print item (PRINT) for setting whether date data is superimposed and printed in printing, an item (PREV) for returning to the previous page shown in FIG. 6C, and an item (NEXT) for returning to the hierarchy higher by one level, similar to the first page. That is, in the state shown in FIG. 6D, by setting the print item, the user can select the first print mode of printing only image data in printing, and the second print mode of superimposing date data on image data and printing them in printing.

Display on the display 8 in accordance with the print item representing whether date data is superimposed and printed will be explained.

Figure 7:
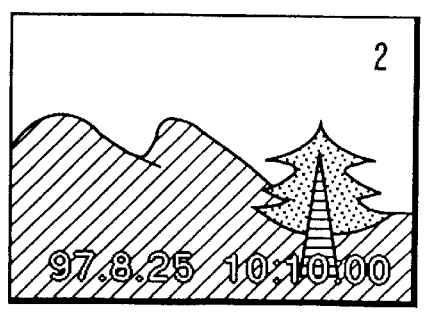
FIG. 7 is a view showing image data on which date data is superimposed.

When the second print mode of superimposing date data on image data and printing them is selected in the electronic camera 1, an image like the one shown in FIG. 7 obtained by superimposing the date data of an image file on the image data is always displayed while the image file is displayed on the display 8.

To the contrary, when the first print mode of printing only image data in printing is selected in the electronic camera 1, an image like the one shown in FIG. 7 obtained by superimposing the date data of an image file on the image data is displayed for a predetermined period (e.g., 3 sec) after the display 8 starts displaying the image file. Then, the display window is switched to display of only the image data, as shown in FIG. 5A. Accordingly, the user can easily confirm whether the electronic camera 1 is in the first print mode or the second print mode without depressing the menu switch 16 and displaying the menu.

The above embodiment has exemplified the case of selecting whether date data is printed. However, the present invention is not limited to this, and whether another attendant data is printed can also be selected. Also in this case, similar to the above embodiment, whether attendant data is superimposed and displayed on the display 8 only for a predetermined period after the start of the display or continuously is controlled in accordance with the first or second print mode.

According to this embodiment, even if the menu for setting the print mode is not displayed, only displaying an image on the display allows the user to easily identify whether attendant data is superimposed and printed, which improves the operability of the electronic camera.

The above embodiment is the first embodiment, and the second embodiment will be described below.

In the first embodiment, when the first print mode is selected, date data is superimposed and displayed only for a predetermined time (e.g., 3 sec) after the start of displaying the image file on the display 8. In this case, however, if the user wants to confirm the data contents upon the lapse of a predetermined time after the start of displaying the image file, the user must perform a cumbersome operation of switching the print mode, or temporarily displaying another image and then displaying a target image.

In the second embodiment, when the user operates a & proper operation switch (e.g., the trigger switch), date data is superimposed and displayed only for a predetermined time (3 sec), and the display window returns to display of only the image. As the operation switch, a dedicated one may be arranged, but the trigger switch is used to prevent an increase in the number of switches. Since the trigger switch is used in the image-pickup mode, it can be used as a date data display switch required in the reconstruction mode without any problem.

According to the second embodiment, when the user wants to confirm data contents while the first print mode is selected, the user only depresses the trigger switch to display the data for 3 sec, and can easily confirm the data contents. After 3 sec, the display window returns to display of only the image, and thus the user can easily confirm the print mode, similar to the first embodiment.

As has been described above, according to the present invention, an electronic camera with good operability which facilitates identification of whether attendant data is superimposed on image data in printing can be realized. Whether at least one of the date and time is superimposed on the image data and printed can be easily identified. Further, the data contents can be always easily confirmed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic camera comprising:
   an image sensing unit for sensing an image;
   a recording medium for storing an image file including image data obtained by said image sensing unit and attendant data;
   a reconstruction unit for reconstructing the image file from said recording medium and outputting the reconstructed image file to a printer;
   a display unit for displaying the image data and attendant data of the image file;
   a selection unit for selecting a first print mode of printing only the image data in printing by the printer, and a second print mode of superimposing and printing the attendant data on the image data in printing; and
   a control unit for selectively executing the first print mode and the second print mode in accordance with selection of said selection unit,
   wherein when the first print mode is selected, said control unit executes a first display mode of superimposing and displaying the attendant data of the image file on the image data for a predetermined period after start of display of the image file on said display unit, and displaying only the image data, and when the second print mode is selected, executes a second display mode of always superimposing and displaying the attendant data of the image file on the image data during display of the image file on said display unit.

2. An electronic camera according to claim 1, wherein the attendant data is data including at least one of a date and time.

3. An electronic camera according to claim 1, wherein said selection unit comprises means for displaying a menu about the print mode on said display unit, and operation means for selectively designating the first print mode and the second print mode from the displayed menu.

4. An electronic camera according to claim 3, wherein the attendant data is data including at least one of a date and time.

5. An electronic camera according to claim 1, wherein said control unit performs superimposition and display in the first display mode only for a predetermined period after a start of display.

6. An electronic camera according to claim 5, wherein the attendant data is data including at least one of a date and time.

7. An electronic camera according to claim 1, wherein said recording medium stores the image data together with a frame number corresponding to the image data, and said reconstruction unit comprises operation means for designating a frame number corresponding to an image to be reconstructed, and means for reading out image data corresponding to the frame number designated by the operation means from said recording medium and outputting the image data to said display unit.

8. An electronic camera according to claim 7, wherein said display unit comprises means for generating a character representing the frame number, and displays an image obtained by superimposing the character on image data.

9. An electronic camera according to claim 1, wherein said electronic camera further comprises an operation member manually operated, and said control unit displays an image obtained by superimposing the attendant data on the image data, on said display unit for a predetermined period in response to operation of the operation member, and displays only the image data on said display unit after a lapse of the predetermined period.

10. An electronic camera according to claim 9, further comprising a trigger switch which is operated in storing image data in said recording medium in an imaging mode, said trigger switch being used as the operation member in the first display mode.

11. An electronic camera according to claim 9, wherein the attendant data is data including at least one of a date and time.

12. An electronic camera according to claim 9, wherein said selection unit comprises means for displaying a menu about the print mode on said display unit, and operation means for selectively designating the first print mode and the second print mode from the displayed menu.

13. An electronic camera according to claim 12, wherein the attendant data is data including at least one of a date and time.

14. An electronic camera according to claim 9, wherein said control unit performs superimposition and display in the first display mode only for a predetermined period after a start of display.

15. An electronic camera according to claim 14, wherein the attendant data is data including at least one of a date and time.

16. An electronic camera according to claim 9, wherein said recording medium stores the image data together with a frame number corresponding to the image data, and said reconstruction unit comprises operation means for designating a frame number corresponding to an image to be reconstructed, and means for reading out image data corresponding to the frame number designated the operation means from said recording medium and outputting the image data to said display unit.

17. An electronic camera according to claim 16, wherein said display unit comprises means for generating a character representing the frame number, and displays an image obtained by superimposing the character on image data.

18. An electronic camera capable of reproducing video data and attendant data, the electronic camera comprising:
   a display unit which displays at least the video data;
   a selector which selects between a first print mode and a second print mode, the first print mode outputting first information for printing only the video data to a printer and the second print mode outputting second information for printing the video data and the attendant data to the printer;
   a first controller which outputs the first information to the printer and displays superimposing the attendant data on the video data for a predetermined period, and then switches the display unit to display only the video data, when the first print mode is selected by the selector, and which outputs the second information to the printer and displays superimposing the attendant data on the video data on the display unit, when the second print mode is selected by the selector; and
   a second controller which displays contents of the attendant data added to the video data in response to input of a trigger signal in a state that the display unit is switched to display only the video data after the first print mode is selected.

19. A electronic camera according to claim 18, wherein the trigger signal is a signal which occurs when a release button is pushed, and the second controller superimposes the attendant data on the video data based on the trigger signal.

* * * * *